US011226100B2

(12) United States Patent
Ryon et al.

(10) Patent No.: US 11,226,100 B2
(45) Date of Patent: Jan. 18, 2022

(54) FUEL MANIFOLDS

(71) Applicant: Delavan Inc., West Des Moines, IA (US)

(72) Inventors: Jason Ryon, Carlisle, IA (US); Lev A. Prociw, Johnston, IA (US); Gregory A. Zink, Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 0 days.

(21) Appl. No.: 16/518,240

(22) Filed: Jul. 22, 2019

(65) Prior Publication Data

US 2021/0025593 A1 Jan. 28, 2021

(51) Int. Cl.
| F23R 3/00 | (2006.01) |
| F23R 3/02 | (2006.01) |
| F02C 7/22 | (2006.01) |
| F02C 7/24 | (2006.01) |
| F23R 3/34 | (2006.01) |

(52) U.S. Cl.
CPC ............... *F23R 3/02* (2013.01); *F02C 7/222* (2013.01); *F02C 7/24* (2013.01); *F23R 3/34* (2013.01)

(58) Field of Classification Search
CPC .... F23R 3/02; F23R 3/34; F23R 3/283; F23R 3/28; F02C 7/222; F02C 7/24
See application file for complete search history.

(56) References Cited

U.S. PATENT DOCUMENTS

| 5,511,375 | A | * | 4/1996 | Joshi | F01D 9/065 |
| | | | | | 239/403 |
| 8,418,468 | B2 | | 4/2013 | McMahan et al. | |
| 9,644,844 | B2 | | 5/2017 | Prociw | |
| 9,784,187 | B2 | * | 10/2017 | Wolfe | F01D 25/00 |
| 2008/0072599 | A1 | | 3/2008 | Morenko et al. | |
| 2011/0247590 | A1 | | 10/2011 | Donovan | |
| 2012/0324863 | A1 | * | 12/2012 | Winkler | F23R 3/20 |
| | | | | | 60/39.463 |

(Continued)

FOREIGN PATENT DOCUMENTS

| CN | 109339951 A | 2/2019 |
| EP | 1167882 A1 | 1/2002 |

(Continued)

OTHER PUBLICATIONS

Extended European Search Report dated Jul. 27, 2020, issued during the prosecution of European Patent Application No. EP 19213153.0.

*Primary Examiner* — Edwin Kang
(74) *Attorney, Agent, or Firm* — Locke Lord LLP; Joshua L. Jones; Scott D. Wofsy

(57) ABSTRACT

A fuel injection system includes an outer support defining a fuel manifold and an inner support, with a feed arm extending radially between the inner support and the outer support. A plurality of outlet openings extending in an axial direction from the feed arm for feeding respective injection nozzles. The feed arm defines a plurality of fuel passages therethrough in fluid communication with the fuel manifold and outlet openings to supply fuel from the fuel manifold to the outlet openings. A heat shield extends from the outer support to the inner support and extends about the outer support and the feed arm to provide heat shielding to the fuel manifold and the fuel passages.

17 Claims, 8 Drawing Sheets

(56) References Cited

U.S. PATENT DOCUMENTS

| | | | |
|---|---|---|---|
| 2014/0338344 A1* | 11/2014 | Stewart | F23R 3/10 60/747 |
| 2014/0338355 A1* | 11/2014 | Stewart | F23R 3/283 60/776 |
| 2016/0252252 A1* | 9/2016 | Dai | F23D 17/002 60/740 |
| 2017/0050242 A1 | 2/2017 | Melton | |
| 2017/0268780 A1* | 9/2017 | Purcell | F23R 3/283 |
| 2017/0350598 A1 | 12/2017 | Boardman et al. | |
| 2017/0363294 A1 | 12/2017 | Grooms et al. | |
| 2018/0156126 A1 | 6/2018 | Snyder | |
| 2018/0202365 A1 | 7/2018 | Hanson | |
| 2018/0283692 A1 | 10/2018 | Ryon et al. | |
| 2019/0137104 A1* | 5/2019 | Jain | F02C 7/222 |
| 2020/0191059 A1* | 6/2020 | Ryon | F02C 7/24 |

FOREIGN PATENT DOCUMENTS

| | | |
|---|---|---|
| EP | 3382280 A1 | 10/2018 |
| EP | 3671039 A1 | 6/2020 |
| WO | 2016/156868 A1 | 10/2016 |

* cited by examiner

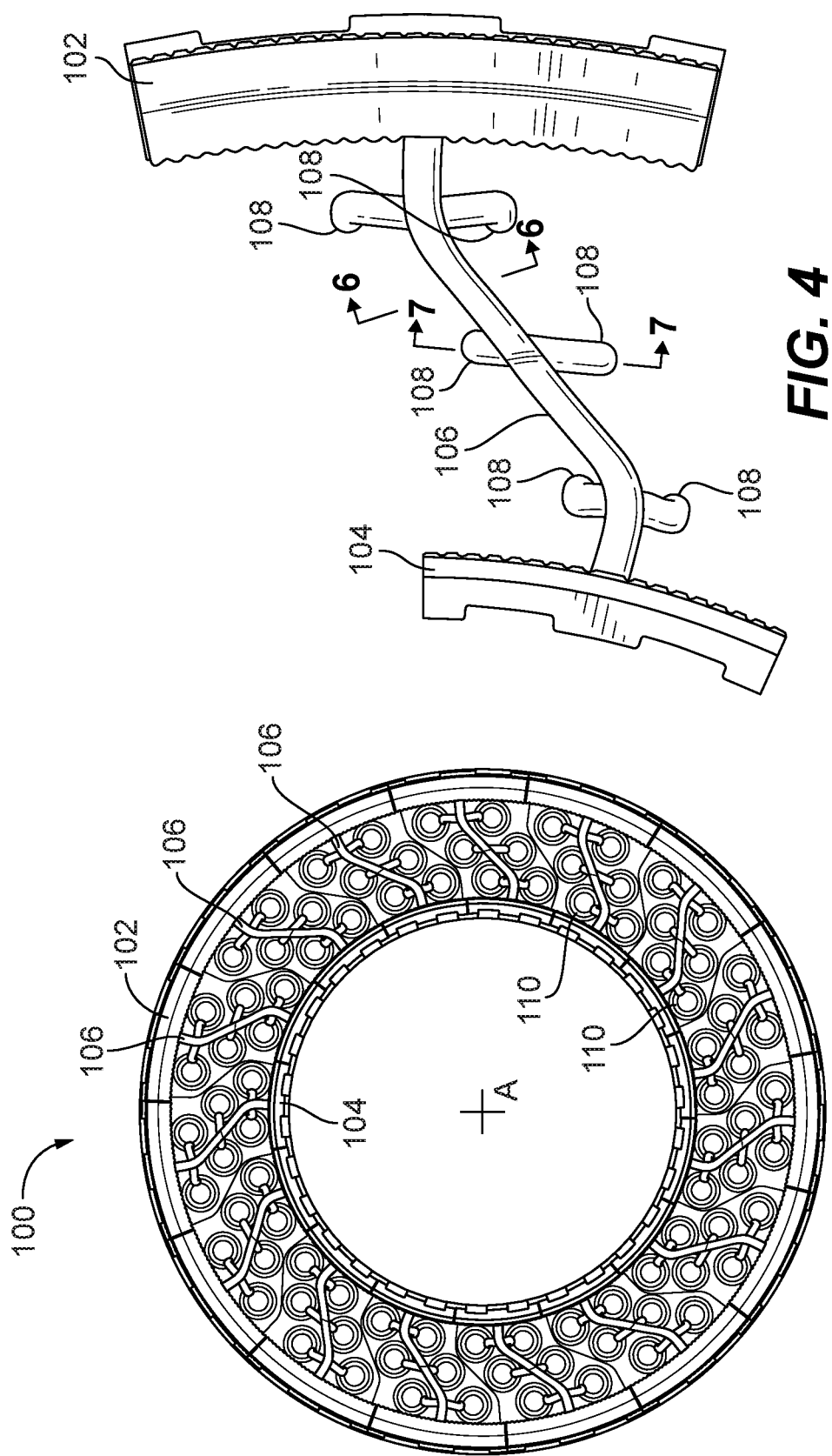

FUEL MANIFOLDS

BACKGROUND

1. Field

The present disclosure relates to combustion systems, and more particularly to fuel manifolds for gas turbine engines.

2. Description of Related Art

Multipoint fuel injection systems would benefit from a simple, low cost fuel injector and manifold construction to permit a large number of injectors to be used. Traditional fuel injector and nozzle designs require complex manifolding that can impede air flow from a compressor to the combustor in a gas turbine engine. Advanced engines require thermal protection to prevent fuel from reaching a temperature where it can break down and grow internal carbon buildup. The conventional techniques have been considered satisfactory for their intended purpose. However, there is an ever present need for improved systems and methods for combustion systems. This disclosure provides a solution for this need.

SUMMARY

A fuel injection system includes an outer support defining a fuel manifold and an inner support, with a feed arm extending radially between the inner support and the outer support. A plurality of outlet openings extending in an axial direction from the feed arm for feeding respective injection nozzles. The feed arm defines a plurality of fuel passages therethrough in fluid communication with the fuel manifold and outlet openings to supply fuel from the fuel manifold to the outlet openings. A heat shield extends from the outer support to the inner support and extends about the outer support and the feed arm to provide heat shielding to the fuel manifold and the fuel passages.

The feed arm and a portion of the heat shield adjacent to the feed arm can follow a vaulted angle. The feed arm and the portion of the heat shield adjacent to the feed arm can define at least one vaulted peak pointed in an axial direction opposite that of the outlet openings.

An insulative gap can be defined between the heat shield and both of the outer support and the feed arm. The heat shield can include openings therethrough for connection of injection nozzles to the outlet openings. The heat shield can be solely supported by flexure structures that connect the heat shield to the inner and outer supports. Each flexure structure can define a plurality of holes through the heat shield into the insulative gap. Each flexure structure can define a curved cross-sectional shape in radial cross-section. The fuel passages in the feed arm can define a plurality of vaulted chambers.

A multipoint fuel injection system includes a circumferentially extending outer support defining a fuel manifold, a circumferentially extending inner support, and a plurality of circumferentially spaced apart feed arms extending radially between the inner support and the outer support. A plurality of outlet openings extend in an axial direction from each feed arm for feeding respective injection nozzles. The feed arm defines a plurality of fuel passages therethrough in fluid communication with the fuel manifold and outlet openings to supply fuel from the fuel manifold to the outlet openings. A single heat shield extends from the outer support to the inner support and extends about the outer support and the feed arms to provide heat shielding to the fuel manifold and the fuel passages.

The outer support can define manifold passages in fluid communication with the fuel passages, wherein the manifold passages extend through the outer support in a circumferential direction. The manifold passages can have axially oriented vaulted surfaces. A radially inner portion of each feed arm can define weight reduction voids therein. Circumferential portions of the heat shield can extend circumferentially from feed arm portions of the heat shield.

A combustor dome can define a combustion space with an inner combustor wall and an outer combustor wall, wherein the combustor dome, inner combustor wall, and outer combustor wall are positioned to provide heat shielding to the inner and outer supports on a combustor side thereof. An outer lock ring can be positioned radially outboard of the outer support to mount the combustor dome, the outer support, and the outer combustor wall together. An inner lock ring can be positioned radially inboard of the inner support to mount the combustor dome, the inner support, and the inner combustor wall together.

A method of making a fuel injector system includes additively manufacturing a circumferentially extending outer support together with a circumferentially extending inner support, a feed arm extending radially between the inner support and the outer support, and a heat shield extending from the outer support to the inner support and extending about the outer support and the feed arm, wherein the heat shield is spaced apart from the feed arm with an insulative gap. Additively manufacturing includes building in an axial build direction beginning from downstream portions of the inner and outer supports.

Additively manufacturing can include forming the feed arm and a portion of the heat shield adjacent the feed arm by additively growing the feed arm and heat shield in the axial build direction, wherein the feed arm and portion of the heat shield adjacent to the feed arm are self-supporting as they are grown and are grown to define a vaulted angle relative to the axial build direction. Additively manufacturing can include forming vaulted weight reduction voids within the feed arm. Additively manufacturing can include forming vaulted fuel manifold passages in the outer support.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is an inlet end elevation view of the system of FIG. 1, showing the full annular combustor dome;

FIG. 4 is an inlet end elevation view of a portion of the system of FIG. 1, showing one of the feed arms as viewed from upstream;

DETAILED DESCRIPTION OF THE PREFERRED EMBODIMENTS

Figure 1:
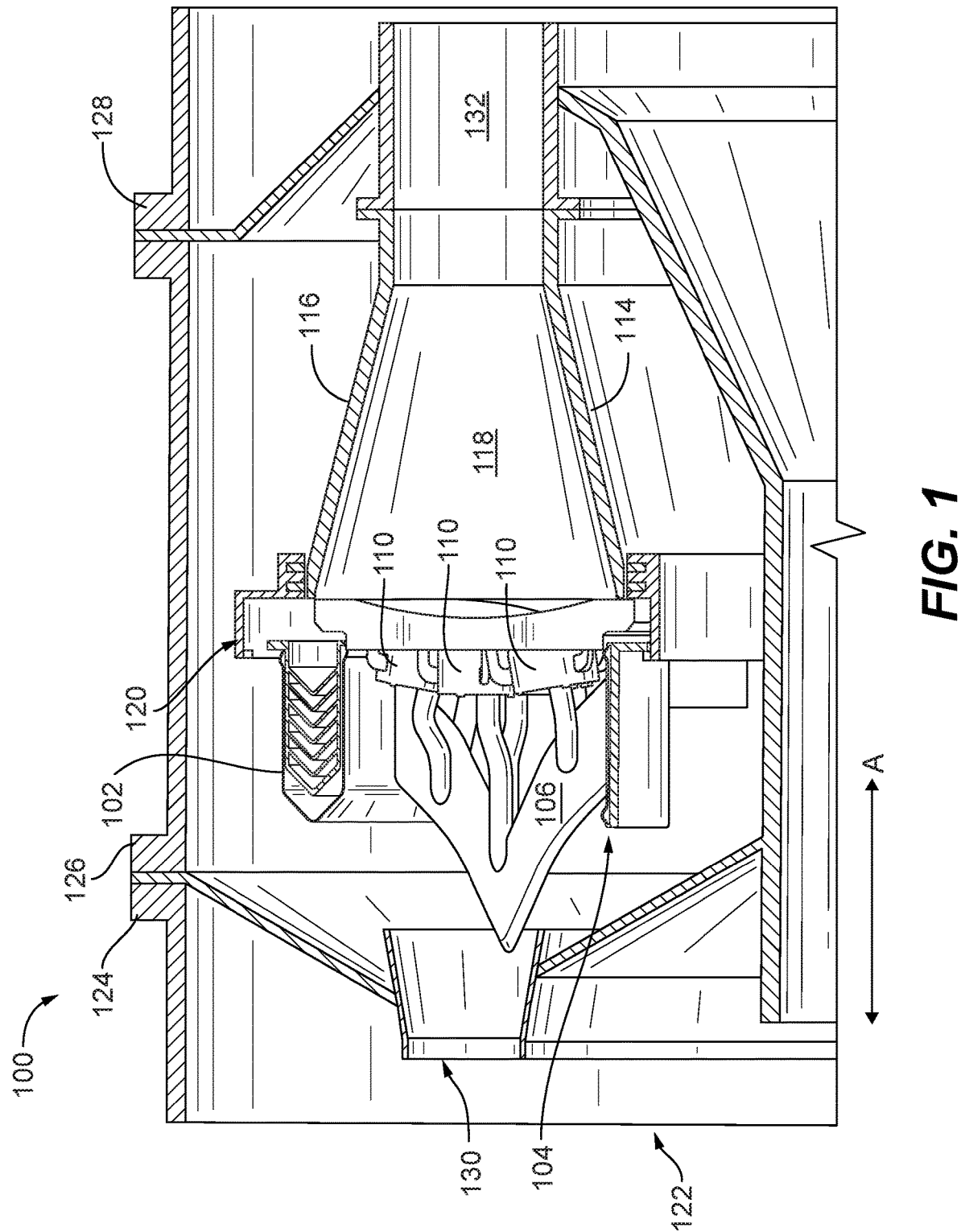
FIG. 1 is a cross-sectional side elevation view of a portion of an embodiment of a multipoint fuel injection system constructed in accordance with the present disclosure, showing the upper cross-section of the combustor.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIGS. 2-11, as will be described. The systems and methods described herein can be used to provide heat shielding, e.g. in internally manifolded multipoint fuel injection systems such as in gas turbine engines.

A multipoint fuel injection system 100 includes a circumferentially extending outer support 102 defining a fuel manifold, a circumferentially extending inner support 104, and a plurality of circumferentially spaced apart feed arms 106 extending radially between the inner support 104 and the outer support 102. Only one feed arm 106 is visible in FIG. 1, but in the view shown in FIG. 3, the plurality of feed arms 106 is shown. A plurality of outlet openings 108 (labeled in FIGS. 4-5) extend in an axial direction A (identified in FIG. 1) from each feed arm 106 for feeding respective injection nozzles 110.

Figure 2:
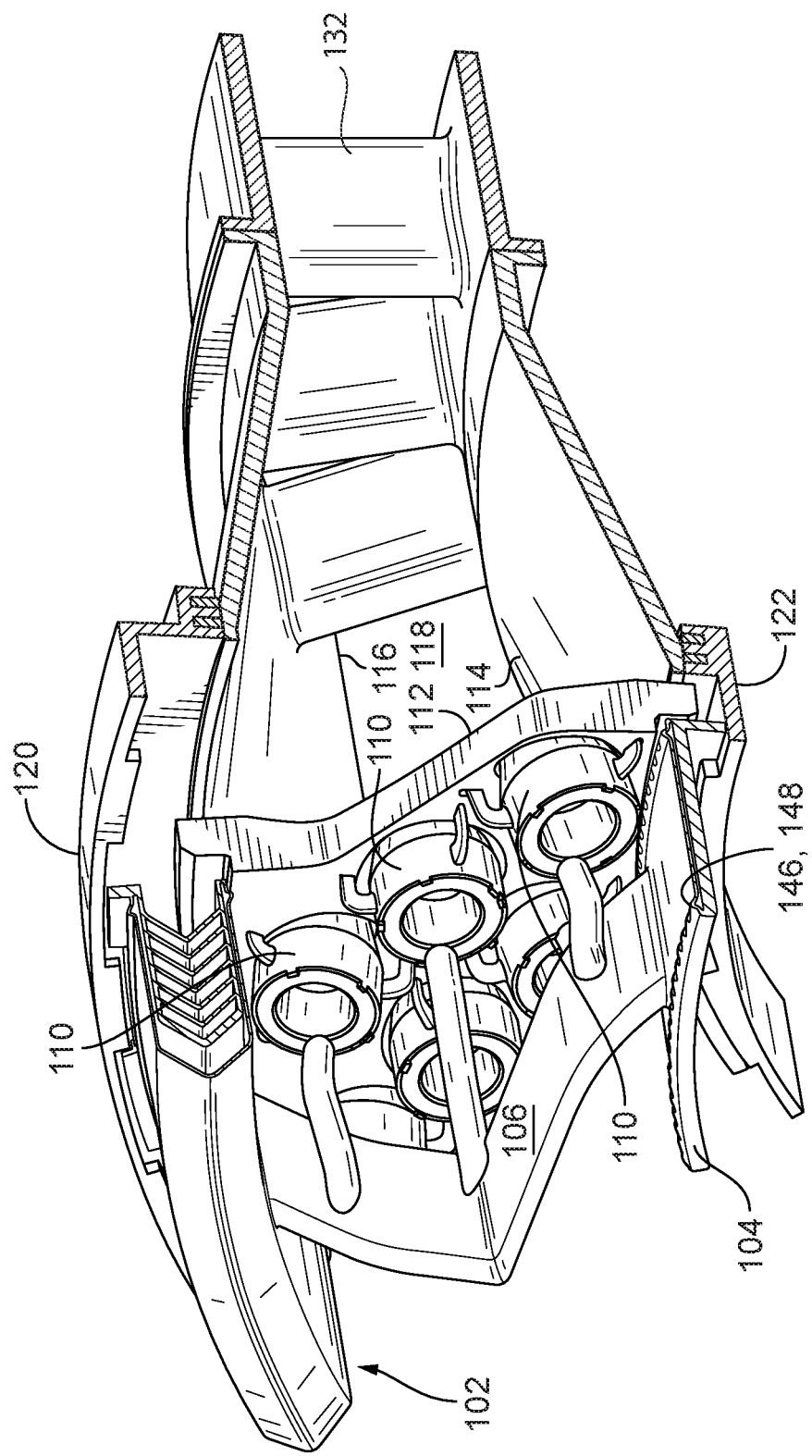
FIG. 2 cut-away perspective view of a portion of the system of FIG. 1, showing the fuel manifold, one of the feed arms, and the corresponding injection nozzles.
Figure 5:
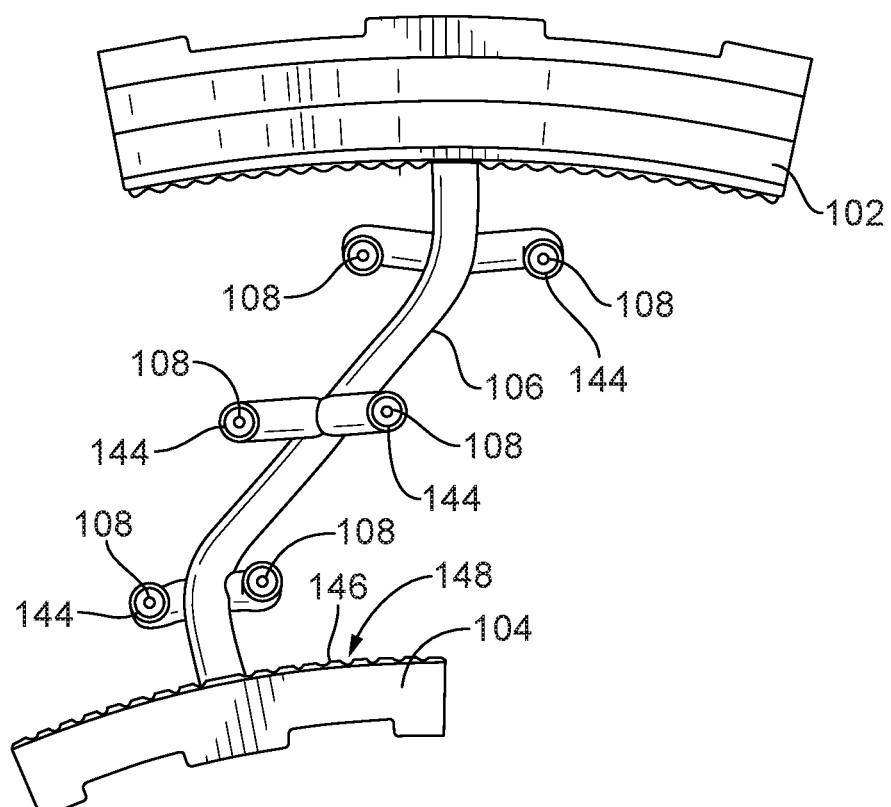
FIG. 5 is an outlet end elevation view of the portion of the system of FIG. 4, showing the feed arm as viewed from downstream.

With reference now to FIG. 2, a combustor dome 112 defines a combustion space 118 with an inner combustor wall 114 and an outer combustor wall 116. The combustor dome 112, inner combustor wall 114, and outer combustor wall 116 are positioned to provide heat shielding to the inner and outer supports 102, 104 on a combustor side thereof. An outer lock ring 120 is positioned radially outboard of the outer support 102 to mount the combustor dome 112, the outer support 102, and the outer combustor wall 116 together. An inner lock ring 122 is positioned radially inboard of the inner support 104 to mount the combustor dome 112, the inner support 104, and the inner combustor wall 114 together.

With reference again to FIG. 1, the inner and outer lock rings 120, 122 are mounted to an engine case that includes a compressor section 124 upstream of a combustor section 126 thereof that is upstream of a turbine section 128 thereof. Compressed air from the compressor section 124 enters the combustor section 126 through the compressor exit and diffusor 130, passes through the injection nozzles 110 into the combustion space 118 as it is mixed with fuel, is combusted in the combustion space 118, and the combustion products pass through the turbine vanes 132 into the turbine section 128 where the power is extracted from the combustion products.

Figure 6:
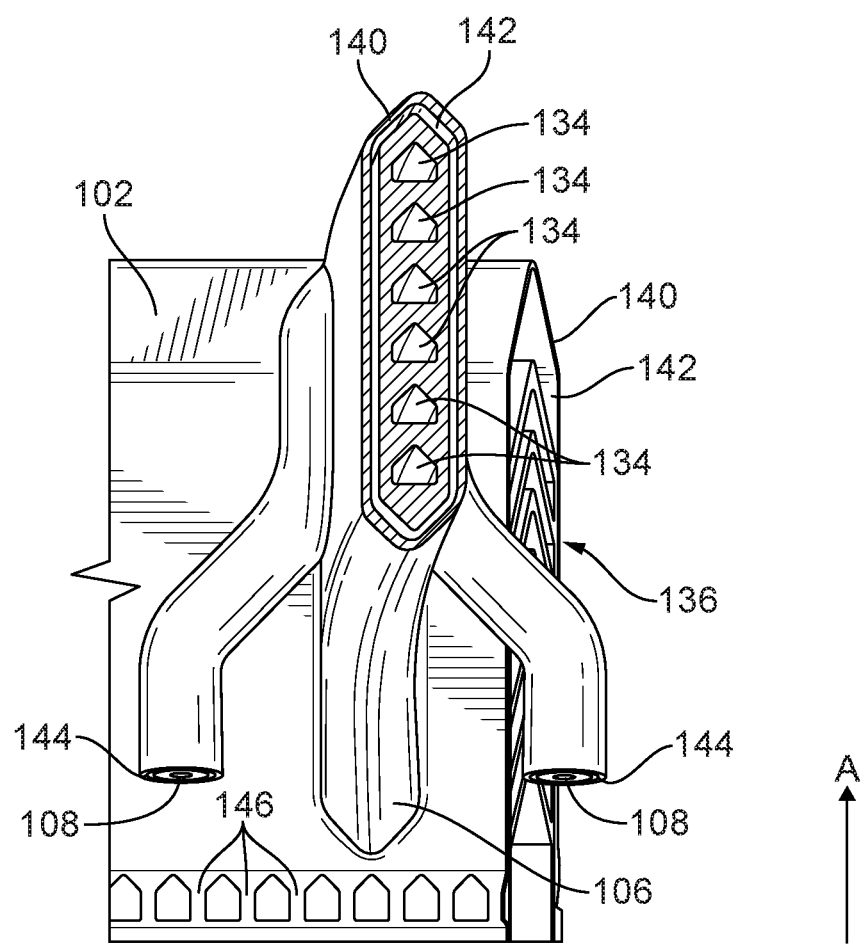
FIG. 6 is a cross-sectional perspective view of the feed arm of FIG. 4, showing the fuel passages and insulative gap at the cross-section indicated in FIG. 4.
Figure 7:
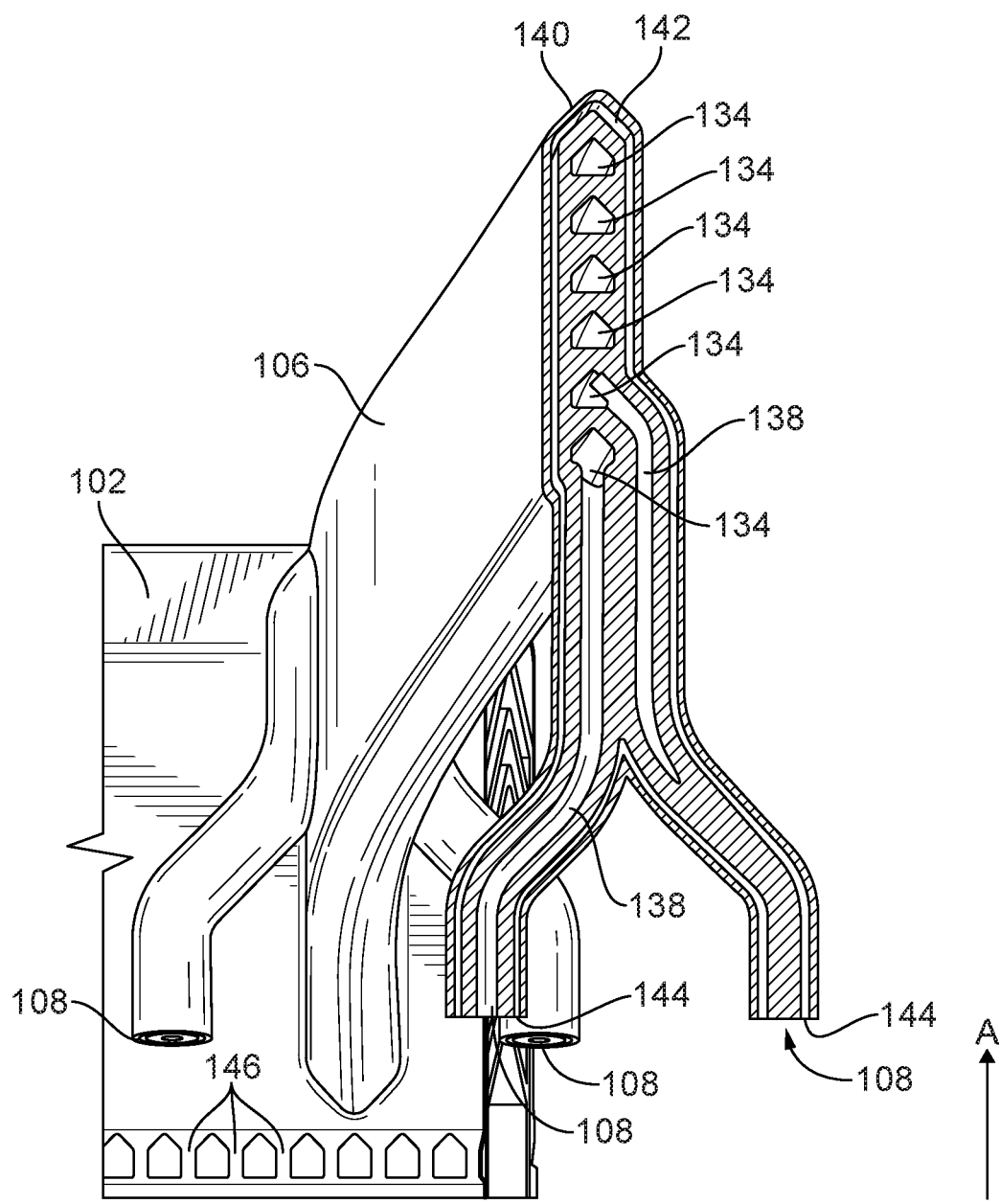
FIG. 7 is a cross-sectional perspective view of the feed arm of FIG. 4, showing the fuel passages and insulative gap at the cross-section indicated in FIG. 4.

With reference now to FIG. 6, the feed arm 106 defines a plurality of fuel passages 134 therethrough in fluid communication with the fuel manifold in the outer support 102, and in fluid communication with the outlet openings 108 to supply fuel from manifold passages 136 of the fuel manifold to the outlet openings 108. The manifold passages 136 extend through the outer support 102 in a circumferential direction. Each of the fuel passages 134 includes a portion 138 that leads from the main portion of the feed arm 106 to the respective outlet 108, as shown in FIG. 7 for two of the outlets 108. The manifold passages 106 and the fuel passages 135 have vaulted, or chevron shaped surfaces that are all axially oriented upward in the same axial direction A.

With continued reference to FIG. 6, a single heat shield 140 extends from the outer support 102 to the inner support 104 (shown in FIGS. 1-2). The heat shield 140 extends about the outer support 102 and the feed arms 106 to provide heat shielding to the fuel manifold passages 136 and the fuel passages 134. This one heat shield 140 shields the outer support 102 and multiple feed arms 106. A single contiguous insulative gap 142 is defined between the heat shield 140 (which is on the outside of the insulative gap 142) and both of the outer support 102 and the feed arm 106 (which are on the inside of the insulative gap 142), so there is nothing separating the portion of the insulative gap 142 shielding the outer support 102 from fluid communication with the portion of the insulative gap 142 shielding the feed arms 106. For the portion of the gap 142 adjacent the feed arm 106 as shown in FIG. 6, the gap is substantially constant all around the feed arm 106. The heat shield 140 includes openings 144 (also labeled in FIGS. 5 and 7) therethrough for connection of injection nozzles 110 (labeled in FIGS. 1 and 2) to the outlet openings 108. The heat shield can be solely supported by flexure structures 146 that connect the heat shield to the inner and outer supports 102, 104. The flexure structures 146 are separated from one another by holes 148, which breathe outward from the insulation gap 142. Given that the air in the insulation gap is stagnant, the holes 148 do not undermine the heat shielding, but do allow for pressure equalization of the gap 142. Each flexure structure 146 can define a curved cross-sectional shape in radial cross-section as shown in FIG. 2.

Figure 8:
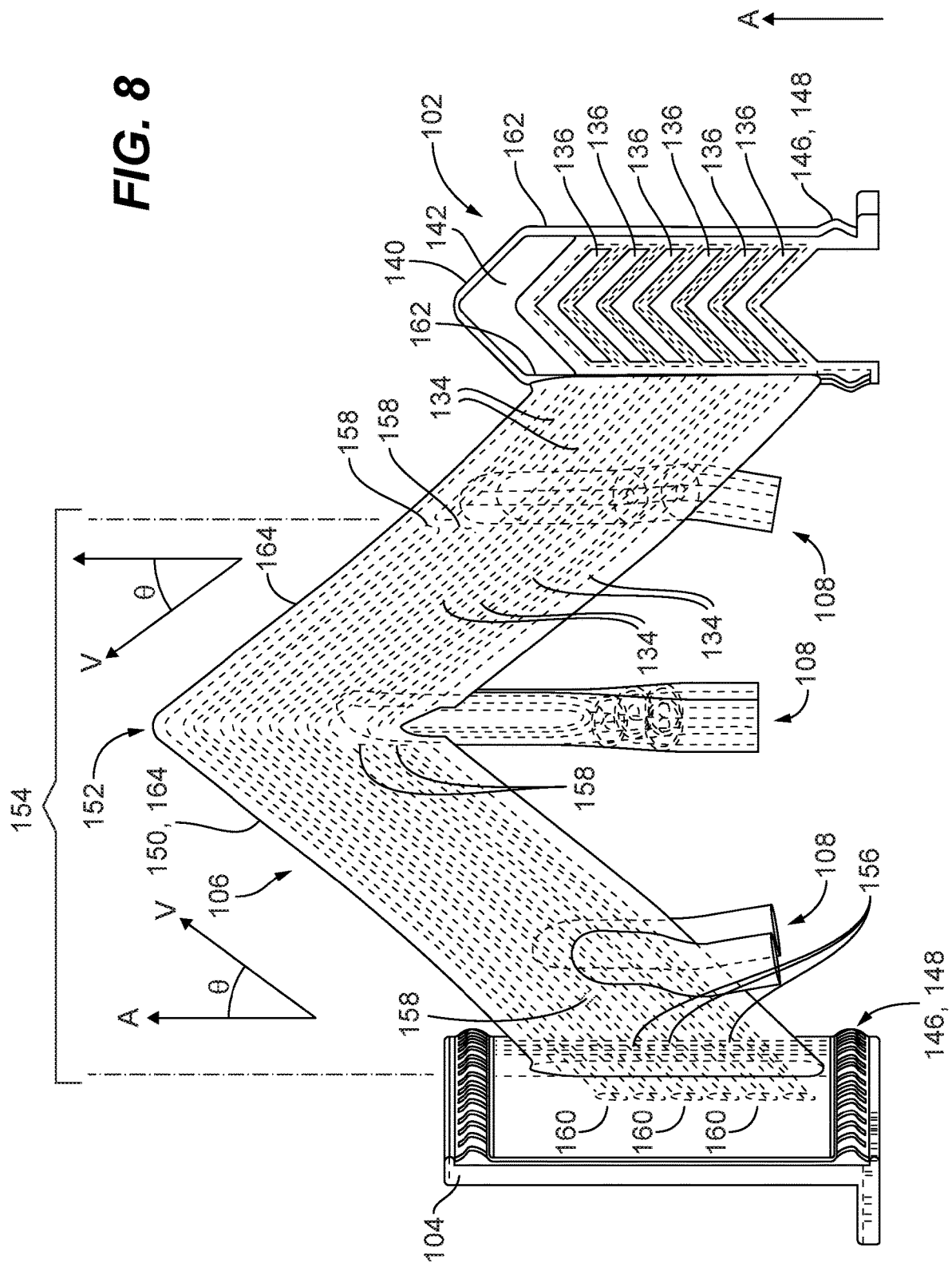
FIG. 8 is a schematic radial elevation view of the feed arm of FIG. 4, showing the portion of the insulative gap in about the fuel manifold, and indicating fuel passages, voids, and walls therebetween, inside the feed arm.

With reference now to FIG. 8, the feed arm 106 and a portion 150 of the heat shield 140 adjacent to the feed arm 106 follow a vaulted, or chevron shaped angle θ on either side of a single peak 152. A radially inner portion 154 of each feed arm 106 defines weight reduction voids 156 therein, which can have the same vaulted, or chevron shaped flow cross-section as shown in FIGS. 6-7 for the fuel passages 134. The fuel passages 134 and voids in the feed arm define respective vaulted, or chevron shaped chambers (the cross-sections for which are shown in FIGS. 6-7). Each respective fuel passage 134 is separated from fluid communication with its respective void 156 by a respective wall 158, which is provided in each fuel passage 134 just downstream of where the branch 138 (labeled in FIG. 7) diverts towards the respective outlet 108. Each of the voids 156 vents through a respective opening 160 on the inner surface of the inner support 104. Circumferential portions 162 of the heat shield 140 extend circumferentially from feed arm portions 164 of the heat shield.

The vaulting, or chevron of the fuel passages 134 and voids 156, the manifold passages 136, the holes 148, and the feed arm 106 and feed arm portion 164 of the heat shield 140 in the same axial direction A facilitate additively manufacturing. The circumferentially extending outer support 102 together with the circumferentially extending inner support 104 and the feed arm 106 and heat shield 140 can be grown or printed as a single build starting from the downstream portions of the inner and outer supports 102, 104 (or the bottom as oriented in FIG. 8), and building upward using a build direction aligned with the axial direction A. The vaulting, or chevron angle θ can be the same or different for the various vaulted surfaces, as long as no vaulted, or chevron shaped surfaces have a vaulting, or chevron angle θ that exceeds the maximum of the additive manufacturing process being used. This allows forming the feed arm 106 and a portion 164 of the heat shield 140 adjacent the feed arm 106 by additively growing the feed arm 106 and heat shield 140 while the feed arm 106 and portion 164 of the heat shield 140 adjacent to the feed arm 106 are self-supporting as they are grown. This reduces or eliminates the amount of support structure that must be additively manufactured into the build.

Figure 9:
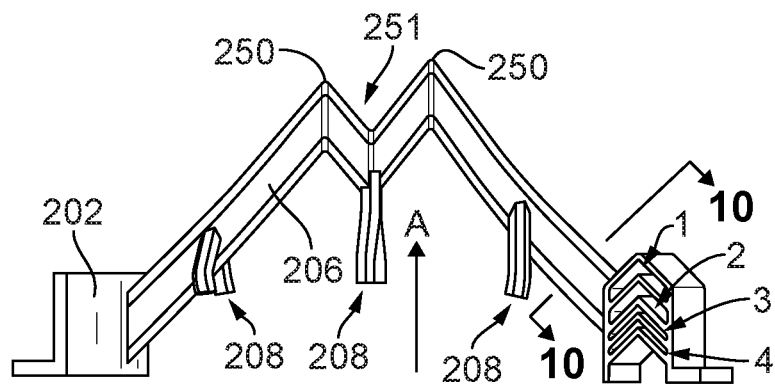
FIG. 9 is a radial elevation view, partially cut away, of another embodiment of a system, showing a feed arm profile with multiple vaulted peaks.
Figure 10:
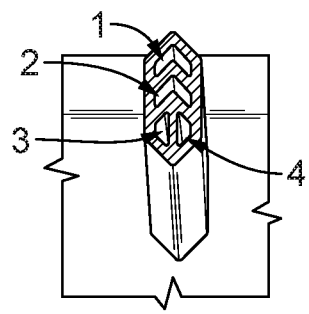
FIG. 10 is a cross-sectional perspective view of the feed arm of FIG. 9, showing the fuel passages inside the feed arm.
Figure 11:
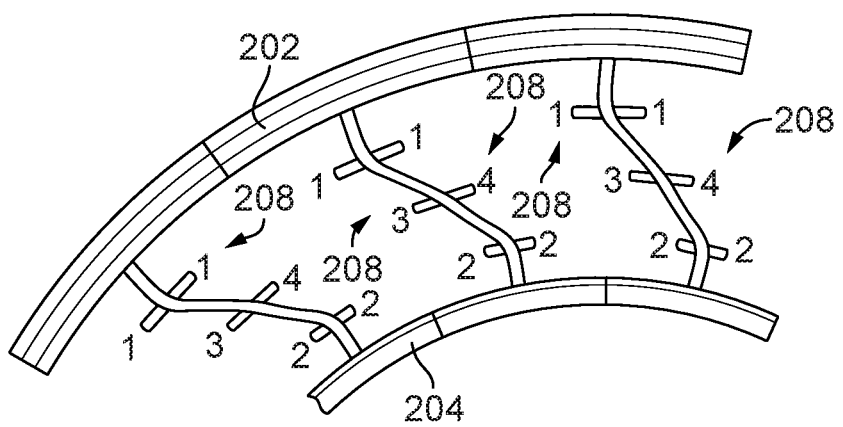
FIG. 11 is an inlet end elevation view of a portion of the system of FIG. 9, showing three of the feed arms.

With reference now to FIGS. 9-11, the feed arm 106 described above has a single peak 150, labeled in FIG. 1, however it is contemplated that any suitable number of peaks can be included. Feed arm 206 is vaulted, or chevron shaped along a profile in the axial direction A that includes two peaks 250, with a valley 251 therebetween (e.g., an "M" shape), where the peaks 250 extend in the opposite direction from the outlet openings 208. While not depicted in FIGS. 9-11, those skilled in the art will readily appreciate that a heat shield conforming to the profile of the feed arm 206 can be included, similar to the heat shield 140 described above. The numerals 1, 2, 3, and 4 in FIGS. 9-11 indicate respective fuel channels through the manifold of the outer support 204, feed arm 206, and outlets 208, respectively. Those skilled in the art will readily appreciate that feed arms 106 and 206 can be aerodynamically contoured to help shape flow from the compressor section 124 into the combustor section 126 (as labeled in FIG. 1).

The methods and systems of the present disclosure, as described above and shown in the drawings, provide for multipoint fuel injection systems with superior properties including improved heat shielding. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A fuel injection system comprising:
    an outer support defining a fuel manifold;
    an inner support, with a feed arm extending radially between the inner support and the outer support;
    a plurality of outlet openings extending in an axial direction from the feed arm for feeding respective injection nozzles, wherein the feed arm defines a plurality of fuel passages therethrough in fluid communication with the fuel manifold and outlet openings to supply fuel from the fuel manifold to the outlet openings; and
    a heat shield extending from the outer support to the inner support and extending about the outer support and the feed arm to provide heat shielding to the fuel manifold and the fuel passages, wherein an insulative gap is defined between the heat shield and both of the outer support and the feed arm, wherein the heat shield is solely supported by flexure structures that connect the heat shield to the inner and outer supports, wherein each flexure structure defines a plurality of holes through the heat shield into the insulative gap.

2. The system as recited in claim 1, wherein the heat shield includes openings therethrough for connection of the injection nozzles to the outlet openings.

3. The system as recited in claim 1, wherein each flexure structure defines a curved cross-sectional shape in radial cross-section.

4. The system as recited in claim 1, wherein the fuel passages in the feed arm define a plurality of chevron shaped chambers.

5. The system as recited in claim 1, wherein the feed arm and a portion of the heat shield adjacent to the feed arm follow a chevron shaped angle.

6. The system as recited in claim 5, wherein the feed arm and the portion of the heat shield adjacent to the feed arm define at least one chevron shaped peak pointed in an axial direction opposite that of the outlet openings.

7. A multipoint fuel injection system comprising:
    a circumferentially extending outer support defining a fuel manifold;
    a circumferentially extending inner support;
    a plurality of circumferentially spaced apart feed arms extending radially between the inner support and the outer support;
    a plurality of outlet openings extending in an axial direction from each feed arm for feeding respective injection nozzles, wherein the feed arm defines a plurality of fuel passages therethrough in fluid communication with the fuel manifold and outlet openings to supply fuel from the fuel manifold to the outlet openings; and
    a single heat shield extending from the outer support to the inner support and extending about the outer support and the feed arms to provide heat shielding to the fuel manifold and the fuel passages, wherein an insulative gap is defined between the heat shield and both of the outer support and the feed arm, wherein the heat shield is solely supported by flexure structures that connect the heat shield to the inner and outer supports, wherein each flexure structure defines a plurality of holes through the heat shield into the insulative gap.

8. The system as recited in claim 7, wherein the outer support defines manifold passages in fluid communication with the fuel passages, wherein the manifold passages extend through the outer support in a circumferential direction, wherein the manifold passages have axially oriented chevron shaped surfaces.

9. The system as recited in claim 7, wherein a radially inner portion of each feed arm defines weight reduction voids therein.

10. The system as recited in claim 7, wherein circumferential portions of the heat shield extend circumferentially from feed arm portions of the heat shield.

11. The system as recited in claim 7, further comprising a combustor dome defining a combustion space with an inner combustor wall and an outer combustor wall, wherein the combustor dome, inner combustor wall, and outer combustor wall are positioned to provide heat shielding to the inner and outer supports on a combustor side thereof.

12. The system as recited in claim 11, further comprising an outer lock ring positioned radially outboard of the outer support to mount the combustor dome, the outer support, and the outer combustor wall together.

13. The system as recited in claim 11, further comprising an inner lock ring positioned radially inboard of the inner support to mount the combustor dome, the inner support, and the inner combustor wall together.

14. A method of additively manufacturing a fuel injector system comprising:
   additively manufacturing an outer support defining a fuel manifold;
   additively manufacturing an inner support;
   additively manufacturing a feed arm extending radially between the inner support and the outer support;
   providing a plurality of outlet openings extending in an axial direction from the feed arm for feeding respective injection nozzles, wherein the feed arm defines a plurality of fuel passages therethrough in fluid communication with the fuel manifold and outlet openings to supply fuel from the fuel manifold to the outlet openings; and
   additively manufacturing a heat shield extending from the outer support to the inner support and extending about the outer support and the feed arm to provide heat shielding to the fuel manifold and the fuel passages, wherein an insulative gap is defined between the heat shield and both of the outer support and the feed arm, wherein the heat shield is solely supported by flexure structures that connect the heat shield to the inner and outer supports, wherein each flexure structure defines a Plurality of holes through the heat shield into the insulative gap,
   wherein additively manufacturing the fuel injector system includes building in an axial build direction beginning from downstream portions of the inner and outer supports.

15. The method as recited in claim 14, wherein additively manufacturing the fuel injector system includes forming the feed arm and a portion of the heat shield adjacent the feed arm by additively growing the feed arm and heat shield in the axial build direction, wherein the feed arm and the portion of the heat shield adjacent to the feed arm are self-supporting as they are grown and are grown to define a chevron shaped angle relative to the axial build direction.

16. The method as recited in claim 14, wherein additively manufacturing the fuel injector system includes forming chevron shaped weight reduction voids within the feed arm.

17. The method as recited in claim 14, wherein additively manufacturing the fuel injector system includes forming the fuel manifold with chevron shaped fuel manifold passages in the outer support.

* * * * *